United States Patent
Meda et al.

(10) Patent No.: US 9,384,454 B2
(45) Date of Patent: *Jul. 5, 2016

(54) ENTERPRISE COMPONENTIZED WORKFLOW APPLICATION

(71) Applicant: BANK OF AMERICA CORPORATION, Charlotte, NC (US)

(72) Inventors: Narasimha Rao Meda, Duluth, GA (US); Athar Syed, Charlotte, NC (US); Shyaam Sundar Neelam, Marietta, GA (US); Zhu Yifei, Alpharetta, GA (US); Deborah A. Copes, Wethersfield, CT (US)

(73) Assignee: Bank of America Corporation, Charlotte, NC (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/771,615

(22) Filed: Feb. 20, 2013

(65) Prior Publication Data

US 2014/0236881 A1    Aug. 21, 2014

(51) Int. Cl.
*G06F 9/455*    (2006.01)
*G06F 9/46*    (2006.01)
(Continued)

(52) U.S. Cl.
CPC .......... *G06Q 10/0631* (2013.01); *G06F 9/4443* (2013.01); *G06F 9/4856* (2013.01); *G06F 9/5077* (2013.01); *G06Q 10/067* (2013.01); *G06Q 10/00* (2013.01)

(58) Field of Classification Search
CPC ........... G06F 8/65; G06F 8/20; G06F 9/4856; G06F 9/5077; G06F 9/45558; G06F 9/5038; G06F 9/54; G06F 9/4443; G06Q 30/02; G06Q 10/06; G06Q 10/0633; G06Q 10/101; G06Q 10/067; G06Q 10/00
See application file for complete search history.

(56) References Cited

U.S. PATENT DOCUMENTS 8,448,170 B2 *   5/2013   Wipfel ................. H04L 9/3213
                                                          718/1
(Continued)

FOREIGN PATENT DOCUMENTS

WO      2009012320 A2    1/2009

OTHER PUBLICATIONS

Tal Garfinkel et al., Terra: A Vitual Machine-Based Platform for Trusted Computing, 2003, [Retrieved on Feb. 2, 2016]. Retrieved from the internet: <URL: http://delivery.acm.org/10.1145/950000/945464/p193-garfinkel.pdf?> 14 Pages (193-206).*

(Continued)

*Primary Examiner* — Thuy Dao
*Assistant Examiner* — Anibal Rivera
(74) *Attorney, Agent, or Firm* — Michael A. Springs; Moore & Van Allen PLLC

(57) ABSTRACT

Systems, methods and computer program products are disclosed that provide an enterprise componentized workflow application (ECWA). In some embodiments, the system includes self-contained components configured for process management, each component including a processor, a memory, and a set of instructions stored in the memory. The loosely-coupled components, with encapsulation, are plug-in configurable, JMX controlled, and throttle and safety enabled. Each component receives a responsibility injection and a capability injection, defining roles and abilities for the components, in order to accomplish business processes. The components define independently-deployed system nodes connected via communication conduits. The ECWA components provide an environment for decentralized workflow management that extends the BPMN model. The system unifies flow-oriented modeling and context-oriented architecture. As a result, the ECWA is appropriate for complex environments due to its flexibility, high processing efficiency, and unifying development cycles. The ECWA may be useful in developing artificial intelligence programs or other complex systems.

19 Claims, 10 Drawing Sheets

(51) Int. Cl.
    G06F 15/16    (2006.01)
    G06Q 10/06    (2012.01)
    G06F 9/44     (2006.01)
    G06F 9/50     (2006.01)
    G06F 9/48     (2006.01)
    G06Q 10/00    (2012.01)

(56) References Cited

U.S. PATENT DOCUMENTS

| | | | | | |
|---|---|---|---|---|---|
| 8,706,947 | B1* | 4/2014 | Vincent | ............... | G06F 9/5077 |
| | | | | | 711/206 |
| 8,819,695 | B2* | 8/2014 | Daute | ............... | G06F 8/71 |
| | | | | | 718/106 |
| 2008/0140759 | A1* | 6/2008 | Conner | ............... | H04L 67/16 |
| | | | | | 709/201 |
| 2008/0140760 | A1* | 6/2008 | Conner | ............... | G06Q 50/10 |
| | | | | | 709/201 |
| 2008/0140857 | A1* | 6/2008 | Conner | ............... | G06Q 10/00 |
| | | | | | 709/236 |
| 2009/0024713 | A1* | 1/2009 | Strasenburgh | ........ | G06F 9/4856 |
| | | | | | 709/208 |
| 2009/0125796 | A1* | 5/2009 | Day | ............... | G06F 9/4443 |
| | | | | | 715/219 |
| 2010/0017783 | A1* | 1/2010 | Brininstool | ............... | G06F 8/20 |
| | | | | | 717/101 |
| 2010/0199276 | A1* | 8/2010 | Umbehocker | ........ | G06F 3/0604 |
| | | | | | 718/1 |
| 2012/0016713 | A1* | 1/2012 | Wilcock | ............... | G06F 9/5038 |
| | | | | | 705/7.27 |
| 2012/0053974 | A1* | 3/2012 | Kulkarni | ............... | G06Q 10/06 |
| | | | | | 705/7.12 |
| 2012/0069131 | A1* | 3/2012 | Abelow | ............... | G06Q 10/067 |
| | | | | | 348/14.01 |
| 2012/0254834 | A1 | 10/2012 | Flurry et al. | | |
| 2012/0260228 | A1 | 10/2012 | Mallick et al. | | |
| 2012/0324069 | A1* | 12/2012 | Nori | ............... | H04L 41/0806 |
| | | | | | 709/222 |
| 2013/0104150 | A1* | 4/2013 | Rdzak | ............... | G06F 9/54 |
| | | | | | 719/328 |
| 2013/0282746 | A1* | 10/2013 | Balko | ............... | G06Q 10/067 |
| | | | | | 707/758 |
| 2014/0075433 | A1* | 3/2014 | Kotton | ............... | G06F 9/45558 |
| | | | | | 718/1 |
| 2014/0195666 | A1* | 7/2014 | Dumitriu | ............ | H04L 12/4625 |
| | | | | | 709/223 |

OTHER PUBLICATIONS vmware, Increase Longevity of IT solutions with VMware vSphere, Jul. 2010, [Retrieved on Feb. 2, 2015]. Retrieved from the internet: <URL: http://www.wei.com/insights/VMware-IncreaseLongevityofITSolutionswithVMwarevSphere.pdf> 10 Pages (1-8).*

Service-oriented architecture, Wikipedia, the free encyclopedia, http://www.en.wikipedia.org/wiki/Service-oriented_architecture. Downloaded from http://en.wikipedia.org/wiki/Service-oriented_architecture on May 21, 2013.

* cited by examiner

FIG. 1  Basic elements of ECWA

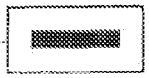 COMPONENT (JVM) FOR A CATEGORY OF BUSINESS PROCESSING

ECWA COMPONENTS ARE CATEGORIZED INTO TWO TYPES
A. BUSINESS PROCESS COMPONENT
 - BUSINESS COMPONENT UPON CLIENT DEVELOPMENT
B. MANAGEMENT COMPONENT
 - SYSTEM COMPONENT ORIENTED FOR BUILDING APPLICATION ENVIRONMENT (E.G., BRIDGE, CONTROLLER, MANAGER, SCHEDULER, OR THE LIKE)

104 — ⟶ CONDUITS ARE COMMUNICATION CHANNELS BETWEEN COMPONENTS

- CONDUITS ARE CATEGORIZED INTO INPUT AND OUTPUT AND BUILT WITH STANDARD IT PROTOCOL (E.G., JMS, SHARED FILE SYSTEM, HTTP, WS (CXF), DB TABLE, CUSTOM, OR THE LIKE)

 COMPONENT TIER (OR PROCESSING NODE)

THE COMPONENT TIER IS COMPOSED BY ONE OR MORE COMPONENT INSTANCES, ONE OR MORE INPUT CONDUITS, AND ONE OR MORE OUTPUT CONDUITS.

THE COMPONENT TIER IS THE BASIC BUILDING BLOCK FOR THE APPLICATION ENVIRONMENT (POOL AND LANE)

 RULE ARCHIVE (BPMN SCHEMA)

THE RULE ARCHIVE IS THE LOCATION FOR ALL BUSINESS RULES, PROCESS RULES, AND CONFIGURATION RULES FOR THE ENVIRONMENT.

 MANAGEMENT CONSOLE

THE ECWA MANAGEMENT CONSOLE IS AN AJAX WEB APPLICATION THAT ALLOWS CLIENTS TO CONFIGURE THE SYSTEM ENVIRONMENT AS WELL AS BUSINESS PROCESS INTO ECWA RULE SCHEMA ACCORDING TO COMPONENTIZING TECHNIQUE.

FIG. 2A Choreography Environment
It is composed by a series components with linear configuration (LANE in BPMN). Business Processing (BP) with four components linked by conduits.
FIG. 2B Orchestration Environment
It is composed by a series components with centralized configuration.
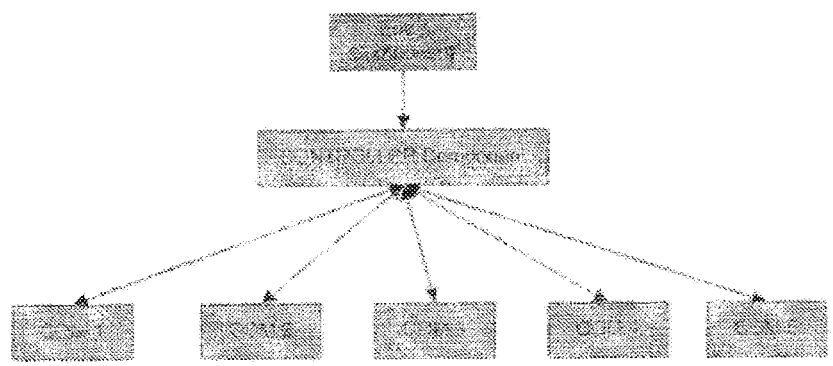

ENTERPRISE COMPONENTIZED WORKFLOW APPLICATION

BACKGROUND

The information era has had profound implications for business in which one key of success is the speed and depth of data analysis, as well as the tradeoffs with cost, efficiency, and flexibility. Service Oriented Architecture (SOA) has provided some flexibility in software development but the low level characteristic and tight coupling between services in SOA blurs the boundaries of the subsystems in the design process, resulting in a rapid degradation of flexibility in large or complex systems.

Component oriented architecture is another approach to providing flexible software development. The current componentizing approach in IT does not emphasize encapsulation by removing dependency and setting up clear boundaries among components, nor does it provide a unique componentizing technique for the self-contained component with the injection of responsibilities and capabilities. Such a component (subsystem) carries the logic of business as well as a module for the participation of large system assembly.

Thus, there is a need for a component oriented architecture that provides a true subsystem structure including decomposition in the business modeling, functional architecture, physical architecture, and/or operational architecture.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one aspect, a system for providing a business application platform is provided. In some embodiments, the system includes a plurality of components, each component comprising a processor, a memory, and a set of instructions stored in the memory, wherein the processor is configured to process a set of business processes and each business process will be executed with a set of pre-injected task instructions; a plurality of communication conduits linking the plurality of components, wherein each component is a self-contained modular logical application node capable of independent deployment and execution.

In some embodiments, the set of instructions include business rules, operational rules, and communication protocols. In further embodiments, the communication protocols include every type of communication protocol native to at least one of the components. In still further embodiments, the system includes a control component configured to receive requests from an external source and propagate the request through the plurality of components. In one embodiment, each component is a Java Virtual Machine. In an embodiment, the system includes a rules database. In a still further embodiment, the components are initialized with rules from the rules database at start-up.

In a further aspect, a method for providing a business application platform is provided. In an embodiment, the method includes providing a plurality of components, each component comprising a processor, a memory, and a set of instructions stored in the memory, wherein the processor is configured to process a set of business processes and each business process will be executed with a set of pre-injected task instructions; providing a plurality of communication conduits linking the plurality of components, wherein each component is a self-contained modular logical application node capable of independent deployment and execution.

In some embodiments, the set of instructions include business rules, operational rules, and communication protocols. In further embodiments, the communication protocols include every type of communication protocol native to at least one of the components. In still further embodiments, the method includes providing a control component configured to receive requests from an external source and propagate the request through the plurality of components. In a still further embodiment, each component is a Java Virtual Machine. In yet still further embodiments, the method includes providing a rules database. In some embodiments, the method includes initializing rules from the rules database at start-up.

In a yet still further aspect, a computer program product for providing a business application platform is provided. In some embodiments, the computer program product includes a non-transitory computer-readable medium including a set of codes stored in a plurality of components, each component comprising a processor, a memory, and a set of instructions stored in the memory, wherein the processor is configured to process a set of business processes and each business process will be executed with a set of pre-injected task instructions; a set of codes for providing a plurality of communication conduits linking the plurality of components, wherein each component is a self-contained modular logical application node capable of independent deployment and execution.

In some embodiments, the set of instructions comprise business rules, operational rules, and communication protocols. In an embodiment, the communication protocols include every type of communication protocol native to at least one of the components. In further embodiments, the computer program product includes a set of codes for a control component configured to receive requests from an external source and propagate the request through the plurality of components. In yet still further embodiments, each component is a Java Virtual Machine. In some embodiments, the computer program product includes a set of codes for providing a rules database, and a set of codes for initializing rules from the rules database at start-up.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 3:
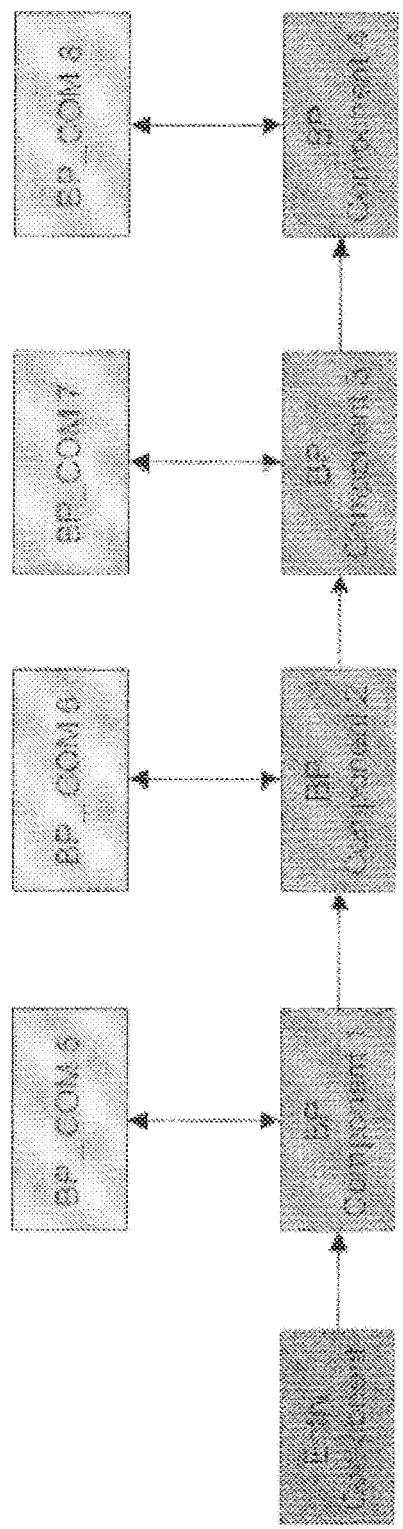
Figure 4:
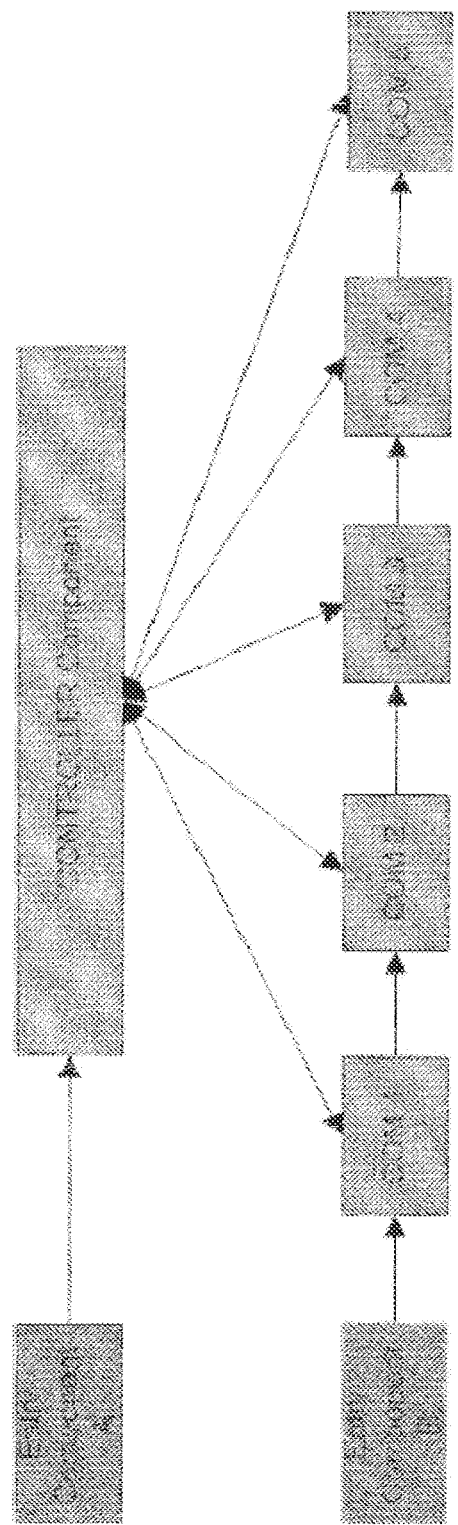
Figure 5:
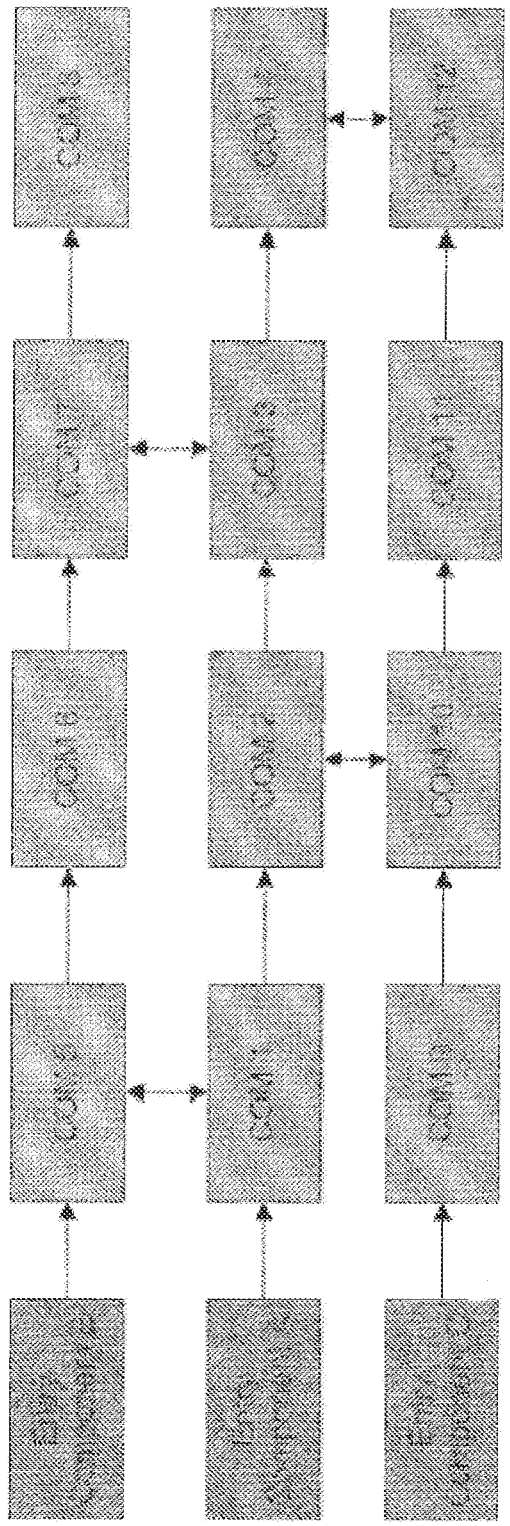
Figure 6:
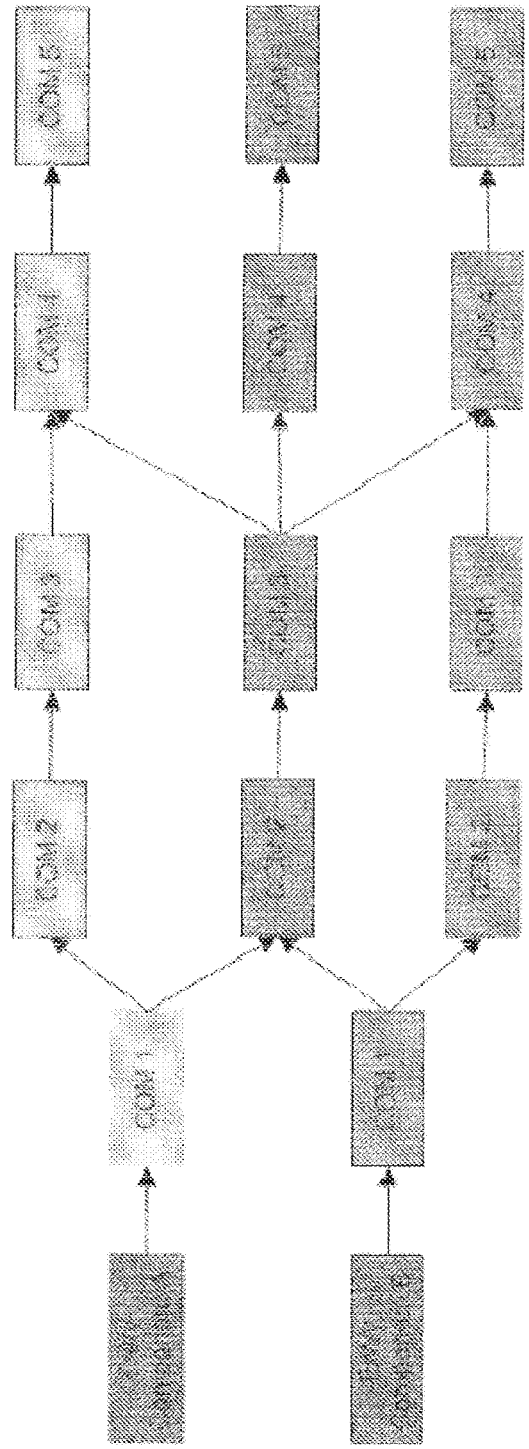
Figure 7:
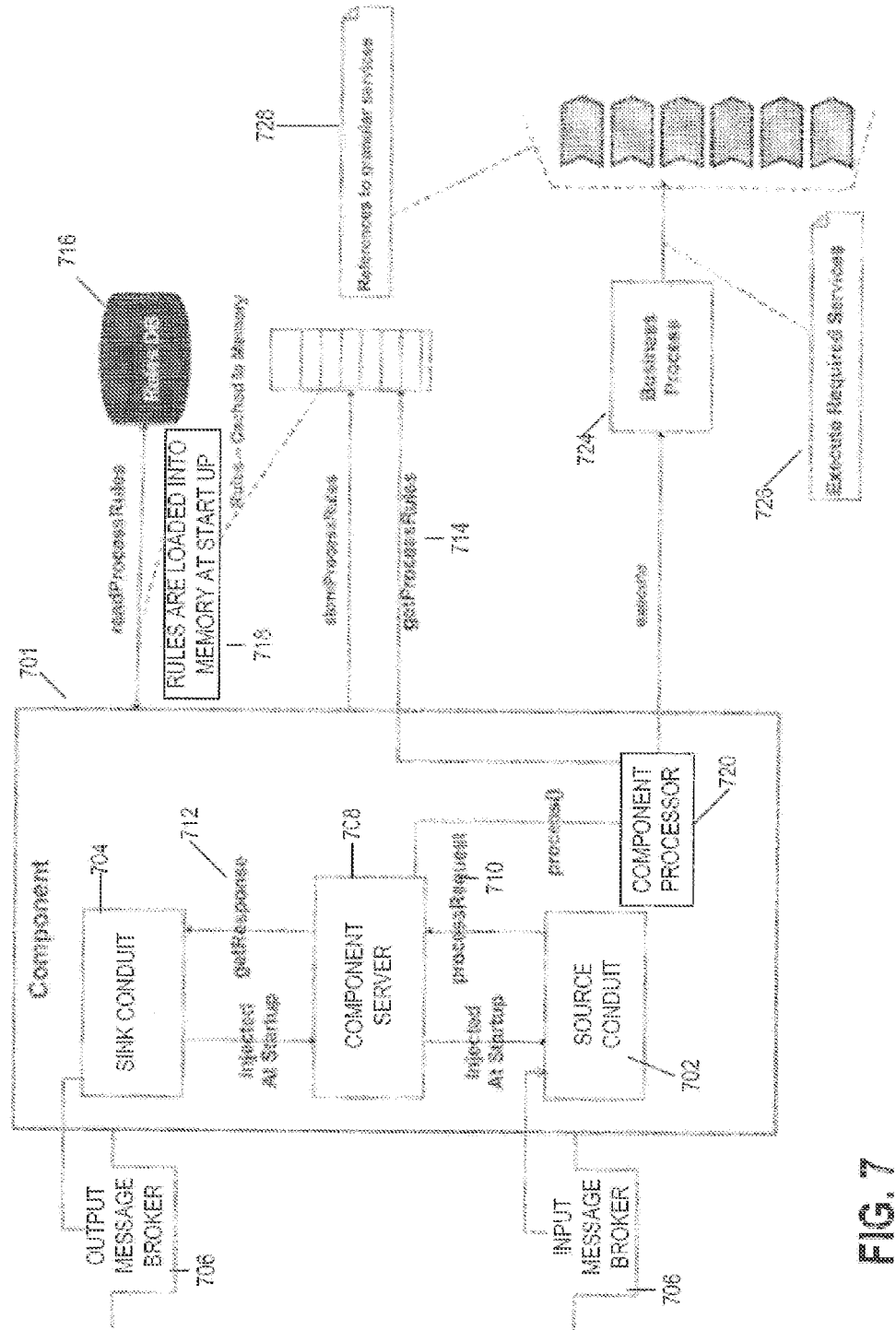
Figure 8:
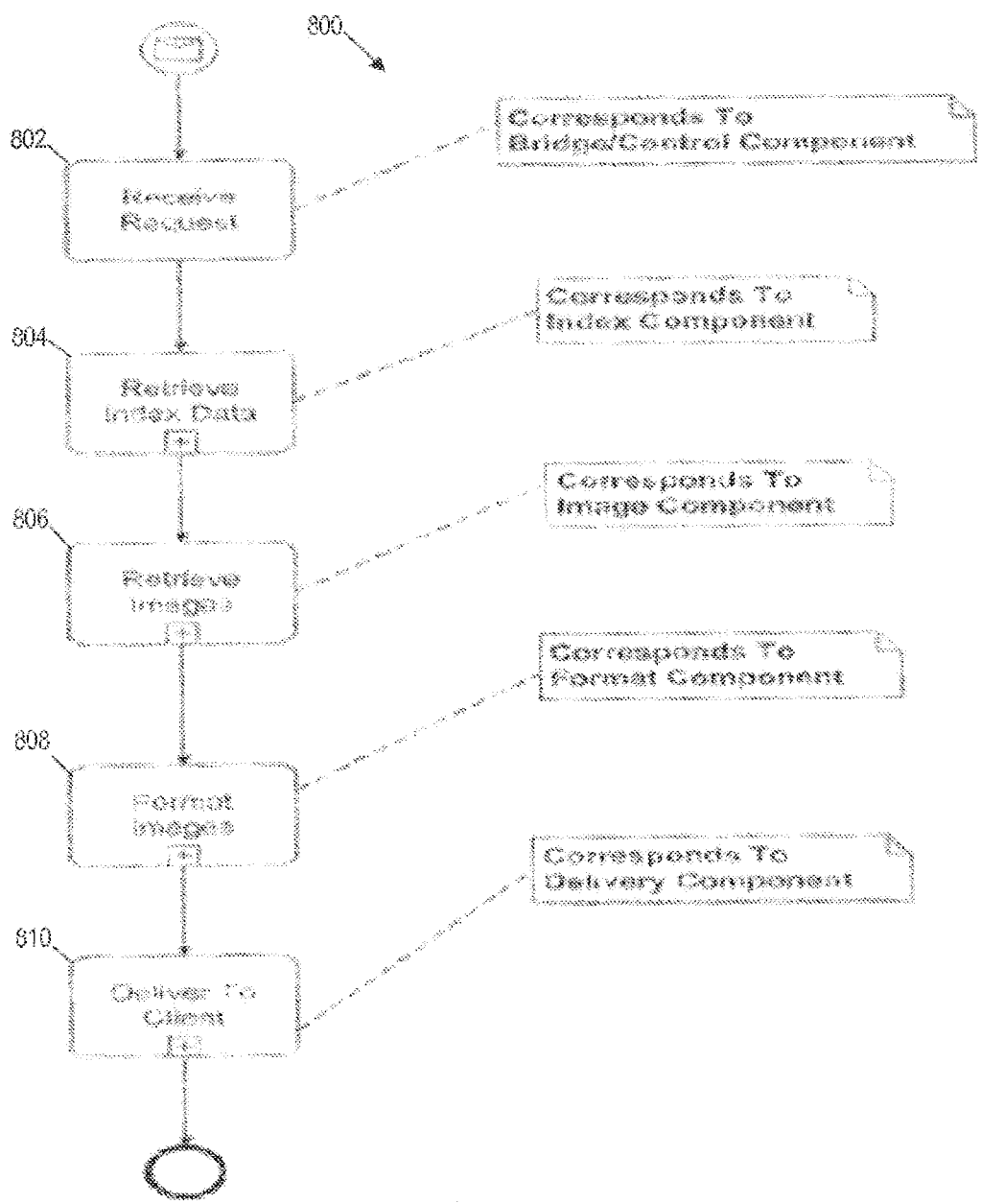
Figure 9:
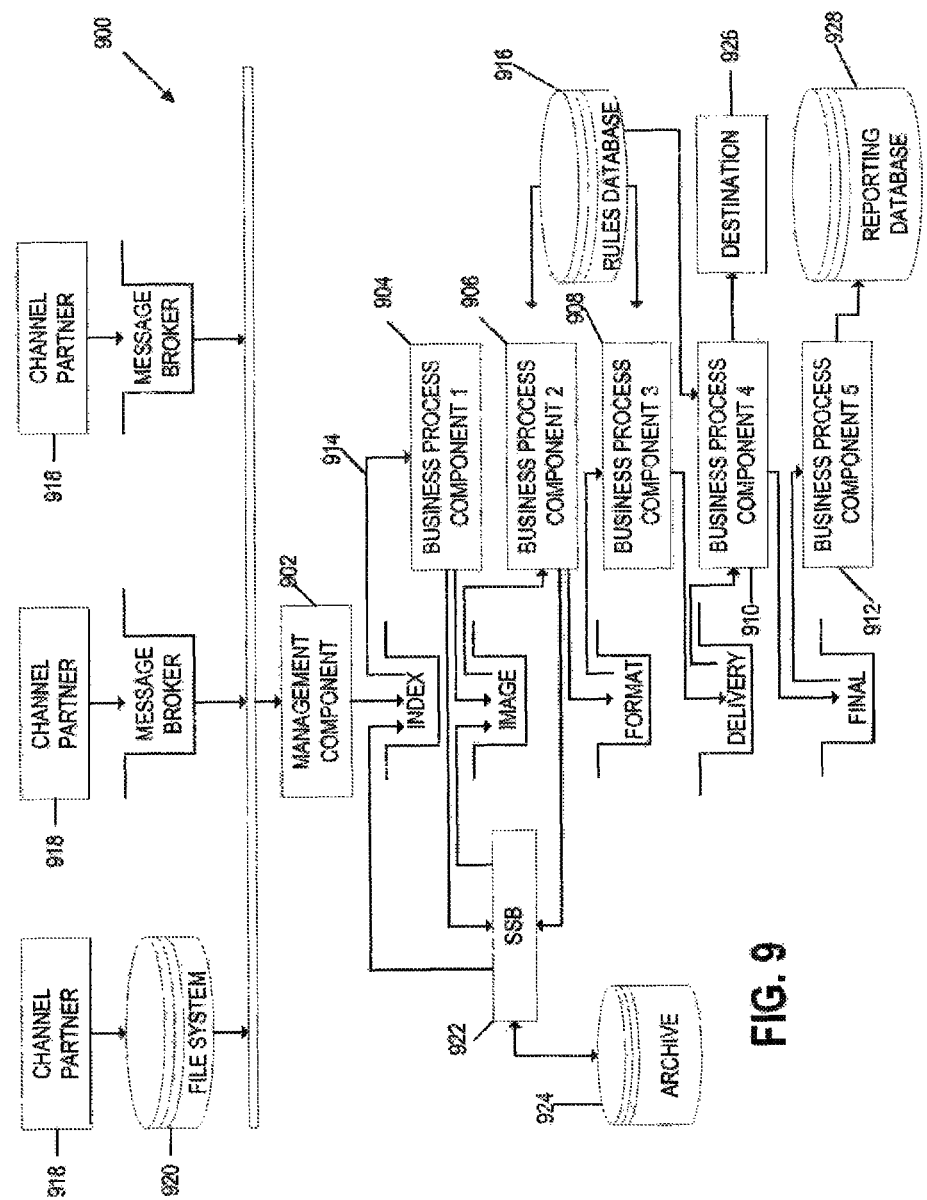
Figure 10:
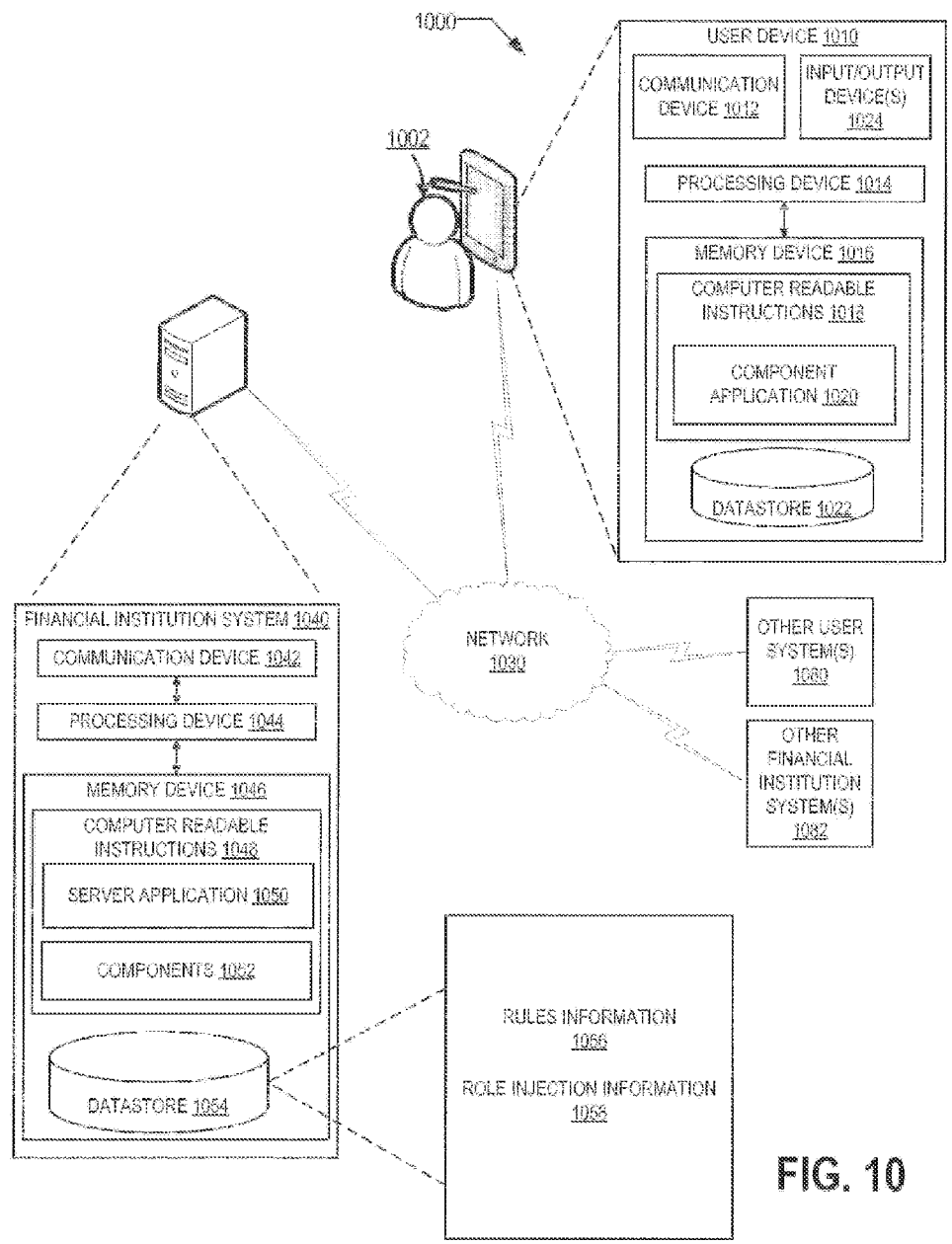

Having thus described embodiments of the invention in general terms, reference will now be made to the accompanying drawings, which are not necessarily drawn to scale, and wherein:

FIG. 1 is an exemplary diagram of elements of an enterprise componentized workflow application (ECWA), in accordance with one embodiment of the present invention;

FIGS. 2A and 2B are block diagrams of environments constructed using the ECWA, in accordance with one embodiment of the present invention;

FIG. 3 is a block diagram of a choreography environment with collaboration, in accordance with one embodiment of the present invention;

FIG. 4 is a block diagram of a shared environment for choreography and orchestration, in accordance with one embodiment of the present invention;

FIG. 5 is a block diagram of an environment for collaboration with multiple LANEs, in accordance with one embodiment of the present invention;

FIG. 6 is a block diagram of an environment for choreography with topology delegation, in accordance with one embodiment of the present invention;

FIG. 7 is a block diagram of a core component overview for a system for providing a business application platform, in accordance with one embodiment of the present invention;

FIG. 8 is a flow diagram of an exemplary business process model for batch-bulk consolidation, in accordance with one embodiment of the present invention;

FIG. 9 is a block diagram of a choreography integration pattern for a system for providing a business application platform, in accordance with one embodiment of the present invention; and FIG. 10 is a block diagram of an environment wherein a user implements the system for providing a business application platform, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

A method of providing a business application platform is provided. In some embodiments shown in FIG. 1, an enterprise componentized workflow application (ECWA) is provided. In an embodiment, the enterprise componentized workflow application includes five elements: (1) a component for a category of business processing; (2) conduits for communication between components; (3) a component tier comprised of components and conduits; (4) a rule archive for extended Business Process Model and Notation (BPMN) schema; and (5) a management console for configuring the system environment and processing rules.

In an embodiment, a business workflow hierarchy comprising activities and tasks is provided. The business workflow hierarchy defines how processes based on external request (e.g., business process requests) are completed using the system architecture. In one embodiment, each activity includes a list of tasks to be performed by a component, wherein a set of activities define a high level workflow order among components. The system architecture can result in a choreography mode or an orchestration mode. In some embodiments of the choreography mode, the system includes business process components but does not include controller components. In the choreography mode, external requests propagate along a physical topology of the business process components. In embodiments of the orchestration mode, the system includes both business process components and controller components, and the external request propagates among business process components using a pre-injected activity order as controlled by the controller component.

Thus, the components may be categorized into two types. A first type of component is a business process component, which is configured by clients to perform a client-specific business process. A business process component may be able to perform multiple tasks associated with a specific business process. In an embodiment, the business process component may be able to process data from disparate external sources in different ways in order to accomplish the business process task assigned to the component via responsibility injection. In this embodiment, the component may be injected with various capabilities in order to process data by collaborating with other components through event or delegating to other components through output conduits. A second type of component is a management component, which assists in building the application environment. Management components may be bridges, controllers, managers, schedulers or the like. The management components may provide central control when necessary for initiating a business process, communicating with external devices, establishing a process architecture, scheduling, and the like. In an embodiment, one or more components are a Java Virtual Machine. Once loaded with the necessary responsibilities and capabilities, each component may be specialized and efficient in performing one or more steps or business processes.

In an embodiment, all of the components on a component tier have the same capabilities initially. For example, each component may have processing power, memory, and ability to implement rules or actions. In some embodiments, the method includes injecting components with the necessary responsibilities and capabilities as needed. For example, various components may be injected with responsibilities defining which rules and/or actions the component will implement. The components may also be injected with, or loaded with, capabilities defining how the component will accomplish the responsibilities that have been assigned to it. If additional resources are needed, the method permits injecting additional components with responsibility and capabilities to meet the additional need. In this manner, components are not pre-built but instead are configured when the business process is implemented. The decentralized nature of the components and the flexibility of calling up components as needed provides a low cost, responsive system for implementing business processes.

As discussed, conduits are communication channels between components. In an embodiment, conduits are categorized into input and output conduits. In a further embodiment, the conduits are built with standard IT protocols, such as JMS, shared filed system, HTTP, WS (CXF), database (DB) table, customer communication, or the like.

A component tier is the basic building block for the application environment and includes one or more components, one or more input conduits, and one or more output conduits. In an embodiment, a set of component tiers defines a pool and/or lane application environment.

The rule archive is an extended BPMN schema and is the location for all business rules, process rules, and configuration rules for the environment. The BPMN schema is a graphical representation for specifying business processes through modeling. BPMN is a business process modeling language that attempts to interpret sequential business entities or processes into an IT system. The ECWA combines the BPMN modeling with System Engineering to create a decentralized approach for flexibility.

In an embodiment, the management console is an Ajax web application that allows clients to configure the system environment as well as business processes into the ECWA rule schema according to componentizing technique. The management console provides a unique componentizing technique for system decomposition. This componentizing technique defines the subsystems, which contain: (1) the functional hierarchy like services and business rules; (2) the operational hierarchy like flow sequences and communication protocols; and (3) the deployment hierarchy comprising the physical architecture (e.g., server container and thread management).

The general nature of the ECWA system has the potential to impact generic IT systems. The product is a broad, architecture framework which can help all IT administrators, especially for complex systems, to organize system in an efficient, low-cost, flexible manner. The method has the potential for impact on artificial intelligence because numerous rules can be processed in parallel and complex issues can be solved quickly.

Turning now to FIG. 2A, an example of a system architecture for an ECWA choreography environment is provided. The choreography environment comprises a series of components in linear configuration, similar to a LANE environment in BPMN. In an embodiment, the environment comprises a management component, such as an entry component, and multiple business process components connected via conduits. The conduits allow the components to communicate with one another and perform their respective, assigned tasks based on responsibility injection.

FIG. 2B discloses an orchestration environment of an ECWA system. In the orchestration environment, multiple management components such as an entry component and a controller component provide more centralized control and assignment of tasks to business process components.

In FIG. 3, in some embodiments the ECWA system provides a choreography environment for collaboration. The components collaborate with other components and devices both inside and outside the system. This environment is similar to POOL in BPMN. The choreography environment for collaboration demonstrates that business process components do not need to go through a management component in order to communicate with devices outside of the system. The business process components comprise the needed functionality, via capability injection, to communicate with external devices.

Turning now to FIG. 4, in some embodiments the ECWA system is used to develop at shared environment for choreography and orchestration. In this environment, management components provide a level of central control with orchestration mode for request from Entry Component A, but the components linked from Entry Component B, COM1, COM2, COM3, COM4, and COM5 form a choreography mode for another request. The components from COM1 to COM5 are self-contained, flexible, and shared with both the orchestration and the choreography mode by the injected rules. As shown in FIG. 4, multiple overlapping components may be provided that implement the same business process and/or management function. For example, both management components Entry Component A and Entry Component B are configured to receive information and/or requests from external sources. While FIG. 4, and all figures herein, disclose communication being directional between pairs of components, it should be understood that communication between components is entirely at the discretion of the system architect. In fact, all components may be configured to communicate with all other components, all components may be configured to communicate with only one other component, or any combination in between. Further, one management component receives external input and routes the input to a controller component for dispersing instructions and/or routing tasks to responsible and capable components.

In FIG. 5, in a still further embodiment the ECWA system provides a system architecture that allows for collaboration with multiple LANES. For example, the ECWA could form the environment for complex collaboration with multiple LANES in which collaboration occurs between different lanes with many different needs. As shown in FIG. 5, communication between components is customizable by the system architect. For example, component 1 and component 5 communicate via a conduit but component 2 and component 6 do not.

In FIG. 6, the ECWA system may provide for choreography with topology delegation. In some embodiments, the ECWA could configure the choreography environment with topology delegation, in which one LANE is shared by one or more lanes for a business delegation requirement. The topology of the architecture defines the relationships between components and allows the user to delegate the path a series of steps will take through the system architecture.

It should be understood that the system architectures disclosed in FIGS. 2-6 are intended to be exemplary and are provided to illustrate the customizable nature of the ECWA system. One skilled in the art would understand that other architectures are possible and even likely given that the architectures will be devised for the specific business processes and management functions that the system architectures are designed to handle.

In some embodiments, the method is embodied in systems and computer program products. In some embodiments, the system includes a plurality of components having a processor, a memory, and a set of instructions stored in the memory, wherein the processor is configured to execute the set of instructions. The system may also include a plurality of communication conduits linking the plurality of components. Each component is a self-contained modular logical application node capable of independent deployment and execution. In an embodiment, each component is a Java Virtual Machine (JVM) configured to perform a specific set of tasks. The system uses the decentralized model of workflow management to replace the conventional centralized model common in the industry. The centralized model has a high degree of dependencies on all operational hierarchies, which is a weakness in large or complex systems and does not allow convenient compartmentalization.

The system provides a unique approach to a business application platform based on the abstraction and generalization of the functional hierarchy, operational hierarchy, and deployment hierarchy. This establishes a modular, lightweight container and dramatically reduces the overhead for each tier. In an embodiment, the system is composed of N numbers of lightweight components linked by communication conduits.

The present disclosure provides a compartmentalized system that allows each of these tasks to be performed by a self-contained compartment that communicates with other compartments as needed. In this manner, low resource utilization tasks, such as indexing, are not slowed by high resource utilization tasks, such as determining images. Similarly, excess resources are used when they are not needed. In other words, if only indexing is needed the system is wasting resources by implementing the indexing through a comprehensive, integrated system. A compartmentalized system would use the appropriate tools and resources for the level of computing power that is requested to accomplish the task.

In a still further embodiment, the dispersed nature of cloud computing makes the disclosed system beneficial for implementing cloud computing solutions. The deployment architecture may be dispersed and updated as resources are needed. Additional functionality and bandwidth may be added to the cloud computing system as the need for the system grows. The flexible nature of the disclosed system also lends itself to a cloud computing environment.

In addition, the system also provides for a methodology of role injection, which includes responsibility and capability injection. Role injection is a large scale dependency injection with correlations among dependent parameters. In some embodiments, role injection establishes a concrete component with a special role and proper encapsulation. The component is compartmentalized and specialized for a specific purpose. The component may be input into the system or changed as part of the system by the user to add or remove capabilities or responsibilities. For example, a plug-in may be loaded dynamically into the system.

The system is configured to host multiple workflow definitions (patterns) either in parallel or nested with dynamical switch capabilities such that the system can handle a complex business requirement with high performance and low cost.

Under principles of system engineering, the decomposition in the deployment stage mirrors the decomposition in design stage. In the system, the integration is accomplished in the design phase by componentizing the process. All components have the integration capabilities including the most common communication protocols and associated data graph. In an embodiment, each component includes the communication protocols that are native to at least one of the components in the system. The resulting system is an effective, flexible product to build complex systems for business application without huge cost.

The ECWA system can be used in complex business applications, such as complex business process with heavy loading requirement. In general, these applications need better business modeling architecture designed for efficiency, flexibility, and low cost.

FIG. 7 provides a block diagram of a core component overview 700 for a system for providing a business application platform, in accordance with one embodiment of the present invention. In some embodiments, the system includes a component 701 including communication conduits, such as source conduits 702 and sink conduits 704, which allow the component 701 to communicate with external sources, such as input and output message brokers 706. For example, the component 701 may receive a request from a message broker through the source conduit 702 and communicate with a sink conduit 704 to get a response to the request.

The components may be stored in a component server 708, which may be a single server or a dispersed, e.g., cloud, server. In some embodiments, the component server 708 includes all of the components that were initiated at start up. In some embodiments, the system processes the request 710 and communicates with the sink conduit 704 to get a response 712. The component server 708 gets rules 714 from a rules database 716, loads the rules 718 into memory at start up, and requests processor service 720. Management components, such as a bridge component, may receive the request. The ECWA system accomplishes the business process 724 by calling up the appropriate self-contained compartmentalized components 701 to execute the required service 726. In this manner, granular services 728 for a specific business process, e.g., extracting text information from an image provided via a mobile device, extracting text information from an image provided via an ATM, and the like, are accomplished by the business process component. The business process component has the capabilities of performing the business process of extracting text information from an image and has been injected with the capabilities to do so via multiple input sources by the system. Not only is this an efficient manner of constructing a system architecture, but the system also has improved error checking capabilities based on the responsibility assigned to different components. For example, if a text extraction routine results in an error, the IT professional evaluating the system would be able to evaluate the rules and components assigned to the specific task rather than having to evaluate the entire system.

Referring to FIG. 8, a flow diagram 800 of an exemplary business process model that may be implemented by the ECWA method and system is provided, in accordance with one embodiment of the present invention. In the example, the system includes a component for providing an index of cashed checks in an online banking environment. The system may also include components for determining images of a check selected by the user, formatting the image such as converting to TIFF or JPG, and providing the formatted image to the user. In earlier systems, each of these tasks was performed by a single component having overlapping use of resources.

In an embodiment, an exemplary application for a banking system is a method that may be implemented using the system disclosed herein. For example, the flow diagram 800 illustrates a series of sequential steps that occur to receive and respond to a request. For example, the business process model discloses that the system may receive a request 802, retrieve index data 804, retrieve images 806, format the images 808, and deliver the formatted images to the client. In some situations, a single system accomplishes all of these tasks. When a single system accomplishes all of these tasks, there is overlap in computing resources between system functions that have grossly different resource requirements. For example, retrieving index data has a low resource requirement and therefore can be accomplished very quickly with very little cost to the system. Retrieving images, in contrast, has a high resource requirement, i.e., retrieving large files uses more processing power and memory than retrieving index information, and thus takes longer to accomplish by the system. When a single system attempts to both index and retrieve images, the indexing may be slowed down because the processor is also performing the tasks associated with retrieving the image.

The instant application discloses, in some embodiments, a system that provides components that are self-contained and able to separately initiate and run each step in a business process. For example, the instant application discloses a system that has a first component that retrieves index data and a second component that retrieves images. Each component includes the processor, memory, and instructions necessary to accomplish the required task assigned to it. Furthermore, each component includes networking capabilities that allow the component to communicate at least with one other component in the system. In some embodiments, each component is configured with communication capabilities to communicate with every other component in the system. It should be understood that while the system will be described with respect to a system that receives a request for an image and provides the image to the requestor, the system may be used to enhance the flexibility of a generic business process system. The flexibility provided by the self-contained components allows complex business processes to be simplified and accomplished using the appropriate level of resources, while saving costs.

In block 802, a component of the system receives a request. In some embodiments, the component that receives the request is a bridge, management, or control component. The bridge component includes processing ability, memory, and instructions that allow the bridge component to receive a request and initiate the process to meet the request. For example, the bridge component may receive the request from a computing system or a channel partner through JMS (IBM MQ or ActiveMQ). In an embodiment, the integration and business rules for processing the request are determined at run time based on the request parameters. The bridge component is configured by capability injection to be able to receive requests from multiple external sources. For example, a single bridge component may have the capabilities to receive requests through JMS, HTTP, WS sources, or the like. This compartmentalization based on process rather than abilities assists users in developing efficient architecture.

In block 804, the system includes a component that retrieves index data. In an embodiment, the system retrieves the index data from a secondary database, such as a database associated with a financial institution. The index data may comprise the list of checks recently cashed by a customer. Index data may be retrieved from multiple sources based on different capabilities injected into the component.

Turning now to block 806, the system may include additional components, such as a component that retrieves images. In some embodiments (not shown), the system may have multiple components that perform the same task. For example, a resource intensive task such as image retrieval may be accomplished by multiple independent components that communicate with one another so that work is not duplicated.

In block 808, a further type of component in the system is disclosed. For example, the system may include a component that modifies data received from a secondary source. For example, the component in block 808 formats the image received in block 806 so that the formatted image can be presented to the requestor in block 810 in a format that the requestor can access. In this manner, the components are disclosed as interrelated, communicating, but also compartmentalized. The image received in block 806 is modified by the processor and instructions in block 808 to format the image, such as to a TIFF or JPEG file, and then made available to a further component for delivery.

As shown in block 810, the delivery component is configured to communicate with a client system and delivery the formatted image to the client. In this manner, the system is disclosed as having communication capabilities for external devices. Furthermore, the system may have multiple components. For example, the system may have a component that is configured to present an image in a first browser and a second component that is configured to present an image in a second browser. In this way, the components are clearly compartmentalized as well as specialized.

It should be understood that other components accomplishing different tasks are envisioned by the disclosure. The system is a self-contained compartmentalized, but communicating system that provides for a decentralized business process and application development.

FIG. 9 provides a block diagram of a choreography integration pattern for a system for providing a business application platform is provided in accordance with one embodiment of the present invention. In an embodiment, FIG. 9 discloses a system architecture 900 that includes the components disclosed in FIG. 8. The system architecture allows for multiple requests to be received and delivered to external parties, or other complex multi-step business processes to be accomplished. In an embodiment, the componentizing architecture includes multiple components 902, 904, 906, 908, 910, 912 connected via communication conduits 914. In some embodiments, integration and business rules are stored in rules database 916, which is also connected to the components. The components are initialized with the business and integration rules from the rules database 916 for the environment at start-up. In further embodiments, a tool is provided for adding and modifying existing process definitions in the rules database, as well as to visualize process details.

In an embodiment, external sources provide input to the system. For example, channel partners 918 may include computing systems having a file system 920, or from other external sources and communicating with the system via software such as IBM MQ or ActiveMQ. The external source may provide a request to the system, which receives the request at the management component 902. When the management component receives the request, the component determines the integration and business rules for processing the request based on the request parameters. For example, if the input was a request for a transfer of funds between accounts, different components then presented may be used and different integration and business rules, e.g., which components in which order, will be determined. In some embodiment, components transfer information through message brokers (MB 1, MB 2, and the like) via the communication conduits 914.

In this example, however, a request causes the system to begin the process of delivering the response and reporting the task to a reporting database. The system initiates the component 902 to evaluate the request. In an embodiment, the component communicates with other elements 922, such as a middleware 922 (archive adapter) connected to an archive 924, to evaluate the request information. In this manner, the system is disclosed as being able to communicate with elements that do not comprise the components as discussed herein. Instead, the system is compartmentalized but flexible enough to incorporate standard components such as an archive adapter into the system architecture.

Again, the components of the system are disclosed as self-contained, e.g., individual JVM's, but interconnected by communication conduits. The system is able to draw from and report to database, such as the rules database 916 or a reporting database 926. The system is configured to communicate with external devices, such as user device 926 (e.g., internet browsers or the like). In some embodiments, the system includes a reporting database 928 that is configured to store all actions of the system.

The architecture disclosed herein is a flexible, self-contained yet compartmentalized enterprise system for a business application platform. The architecture is exemplary and other components, external sources, and communication conduits are possible.

Referring now to FIG. 10, a block diagram of an environment wherein a user implements the system for providing a business application platform is provided, in accordance with one embodiment of the present invention. In some embodiments, the system is provided as part of a financial institution system. In an embodiment, the financial institution system 1040 receives a new component for the system from a user 1002 because the system is compartmentalized and capable of flexible growth depending on system needs. The environment also may include other user systems 1080 and/or other financial institution systems 1082. The systems and devices communicate with one another over a network 1030 and perform one or more of the various steps and/or methods according to embodiments of the invention discussed herein.

A user device 1010 may be configured for use by a user 1002 such as a programmer, financial institution employee, or contract worker, for example, to access one or more other financial institution applications such as a component application 1020. The user device 1010 may be or include a computer system, server, multiple computer system, multiple servers, or some other computing device configured for use by a user, such as a tablet computer, a desktop, laptop, or a mobile communications device, such as a smartphone. The user device 1010 has a communication device 1012 communicatively coupled with a processing device 1014, which is also communicatively coupled with a memory device 1016 and one or more input and/or output devices 1024, for example, an image capture device such as camera and/or a microphone. The processing device 1014 is configured to control the communication device 1012 such that the user device 1010 communicates across the network 430 with one or more other systems. The processing device 1014 is also configured to access the memory device 1016 in order to read the computer readable instructions 1018, which in some embodiments include a component application 1020. The memory device 1016 also may have a datastore 1022 or database for storing pieces of data for access by the processing device 1014.

A financial institution system 1040 is a computer system, server, multiple computer systems and/or servers or the like. The financial institution system 1040, in the embodiments shown has a communication device 1042 communicably coupled with a processing device 1044, which is also communicably coupled with a memory device 1046. The processing device 1044 is configured to control the communication device 1042 such that the financial institution system 1040 communicates across the network 1030 with one or more other systems. The processing device 1044 is also configured to access the memory device 1046 in order to read the computer readable instructions 1048, which in some embodiments includes a server application 1050. The memory device 1046 also has a datastore 1054 or database for storing pieces of data for access by the processing device 1044. In some embodiments, the components 1052 are also present as part of the financial institution system 1040.

In some embodiments, the datastore 1054 includes the rules information 1056 including business rules and role injection criteria 1058 to establish business components at system startup time, which involves responsibility injection and capability injection into abstract component containers. Role injection is a large scale dependency rejection with correlations among dependent parameters, and allows removing hard-coded dependencies either at run time or compile-time.

The applications 1020 and 1050 are for instructing the processing devices 1014 and 1044 to perform various steps of the methods discussed herein, and/or other steps and/or similar steps. In various embodiments, one or more of the applications 1020 and 1050 are included in the computer readable instructions stored in a memory device of one or more systems other than the systems 1040 or device 1010. For example, in some embodiments, the application 1020 is stored and configured for being accessed by a processing device of one or more other user systems 1080 connected through network 1030. In various embodiments, the applications 1020 and 1050 are stored and executed by different systems/devices are different. In some embodiments, the applications 1020 and 1050 are stored and executed by different systems may be similar and may be configured to communicate with one another, and in some embodiments, the applications 1020 and 1050 may be considered to be working together as a singular application despite being stored and executed on different systems. In some embodiments, the applications 1020 and 1050 stored and executed by the customer device and/or an application stored and executed on one of the other systems is a stand-alone application and does not necessarily communicate or rely on any other applications for data, processing or otherwise.

In various embodiments, one of the systems discussed above, such as the financial institution system 1040, is more than one system and the various components of the system are not aggregated, and in various embodiments, there are multiple components performing the functions indicated herein as a single device. For example, in one embodiment, multiple processing devices perform the functions of the processing device 1044 of the financial institution system 1040 described herein. In various embodiments, the financial institution system 1040 includes one or more of the other financial institution systems 1082 and/or any other system or component used in conjunction with or to perform any of the method steps discussed herein.

The processor, and other processors described herein, may generally include circuitry for implementing communication and/or logic functions. For example, the processor may include a digital signal processor device, a microprocessor device, and various analog to digital converters, digital to analog converters, and/or other support circuits. Control and signal processing functions of the device may be allocated between these devices according to their respective capabilities. The processor thus may also include the functionality to encode and interleave messages and data prior to modulation and transmission. The processor may additionally include an internal data modem. Further, the processor may include functionality to operate one or more software programs or applications, which may be stored in the memory. For example, the processor may be capable of operating a connectivity program, such as a web browser application. The web browser application may then allow the device to transmit and receive web content, such as, for example, location-based content and/or other web page content, according to a Wireless Application Protocol (WAP), Hypertext Transfer Protocol (HTTP), and/or the like.

The processor may be configured to use a network interface to communicate with one or more other devices on a network. In this regard, the network interface may include an antenna operatively coupled to a transmitter and a receiver (together a "transceiver"). The processor may be configured to provide signals to and receive signals from the transmitter and receiver, respectively. The signals may include signaling information in accordance with the air interface standard of the applicable cellular system of the wireless telephone network that may be part of the network. In this regard, the device may be configured to operate with one or more air interface standards, communication protocols, modulation types, and access types. By way of illustration, the device may be configured to operate in accordance with any of a number of first, second, third, and/or fourth-generation communication protocols and/or the like. For example, the device may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The device may also be configured to operate in accordance with non-cellular communication mechanisms, such as via a wireless local area network (WLAN) or other communication/data networks.

As described above, the user device may have a user interface that includes user output devices and/or user input devices. The user output devices may include a display (e.g., a liquid crystal display (LCD) or the like) and a speaker or other audio device, which are operatively coupled to the processor. The user input devices, which may allow the device to receive data from a user, may include any of a number of devices allowing the mobile device to receive data from a user, such as a keypad, keyboard, touch-screen, touchpad, microphone, mouse, joystick, stylus, other pointer device, button, soft key, and/or other input device(s).

The user device may further include a power source. Generally, the power source is a device that supplies electrical energy to an electrical load. In one embodiment, power source may convert a form of energy such as solar energy, chemical energy, mechanical energy, and such to electrical energy. Generally, the power source in the device may be a battery, such as a lithium battery, a nickel-metal hydride battery, or the like, that is used for powering various circuits, e.g., the transceiver circuit, and other devices that are used to operate the device. Alternatively, the power source may be a power adapter that can connect a power supply from a power outlet to the device. In such embodiments, a power adapter may be classified as a power source "in" the device.

The user device may also include the memory operatively coupled to the processor. As used herein, memory may include any computer readable medium configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory may additionally or alternatively include an electrically erasable programmable read-only memory (EEPROM), flash memory or the like. The memory may store any of a number of applications or programs which comprise computer-executable instructions/code executed by the processor to implement the functions of the device described herein.

Various embodiments or features will be presented in terms of systems that may include a number of devices, components, modules, and the like. It is to be understood and appreciated that the various systems may include additional devices, components, modules, and the like and/or may not include all of the devices, components, modules and the like, discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a business application platform, the system comprising:
 a plurality of components, each component comprising a processor and a memory, wherein the processor is configured to process a set of business processes and each business process is executed with a set of pre-injected task instructions, wherein each component is a self-contained modular logical application node capable of independent deployment and execution, and wherein each of the plurality of components has an equal initial capability of processing power, memory capacity, and ability to implement rules or actions;

a plurality of communication conduits linking the plurality of components, the plurality of components and communication conduits defining a component tier;

a rules archive comprising responsibility rules and capability rules;

a management console, used to configure an injection to the component tier with responsibility rules and capability rules to perform one or more external requests;

a determining module stored in the memory, comprising computer executable instructions that when executed by the processor cause the processor to:

receive an external request;

determine, based on the external request, a need for a specialized component at a location of a first component of the plurality of components in the system, wherein the specialized component includes a specialized capability comprising an adjustment to the initial capability of the first component to meet the need;

determine an additional capability, wherein the additional capability comprises a difference between the required specialized capability and the initial capability of the first component, and wherein the additional capability comprises an addition to the processing power, the memory capacity, or the ability to implement rules or actions for the first component;

receive, from a user device associated with a user, the additional capability; and inject the additional capability dynamically into the first component in the system using the management console, whereby injecting the additional capability dynamically into the first component creates the specialized component without requiring an inclusion of an additional component into the system.

2. The system of claim 1, wherein the set of pre-injected task instructions comprise business process rules, operational rules, and communication protocols.

3. The system of claim 2, wherein the communication protocols include every type of communication protocol native to at least one of the plurality of components.

4. The system of claim 1, further comprising a control component configured to receive requests from an external source and propagate the request through the plurality of components.

5. The system of claim 1, wherein the rules archive loads the rules to the component tier before the external request is received.

6. The system of claim 5, wherein each of the plurality of components are initialized with rules from the rules archive at start-up.

7. A method for providing a business application platform, the method comprising:

providing a plurality of components, each component comprising a processor and a memory, wherein the processor is configured to process a set of business processes and each business process is executed using a set of pre-injected instructions, wherein each component is a self-contained modular logical application node capable of independent deployment and execution, and wherein each of the plurality of components has an equal initial capability of processing power, memory capacity, and ability to implement rules or actions;

providing a plurality of communication conduits linking the plurality of components, the plurality of components and communication conduits defining a component tier;

providing a rules archive comprising responsibility rules and capability rules;

providing a management console, used to configure the injection of responsibility rules and capability rules for the component tier to perform one or more external requests;

receiving an external request;

determining, based on the external request, a need for a specialized component at a location of a first component of the plurality of components in the system, wherein the specialized component includes a specialized capability comprising an adjustment to the initial capability of the first component to meet the need;

determining an additional capability, wherein the additional capability comprises a difference between the required specialized capability and the initial capability of the first component, and wherein the additional capability comprises an addition to the processing power, the memory capacity, or the ability to implement rules or actions for the first component;

receiving, from a user device associated with a user, the additional capability; and injecting the additional capability dynamically into the first component in the system using the management console, whereby injecting the additional capability dynamically into the first component creates the specialized component without requiring an additional component into the system.

8. The method of claim 7, wherein the pre-injected set of instructions comprise business process rules, operational rules, and communication protocols.

9. The method of claim 7, wherein the communication protocols include every type of communication protocol native to at least one of the plurality of components.

10. The method of claim 7, further comprising providing a control component configured to receive requests from an external source and process/propagate the request through the plurality of components in an orchestration mode.

11. The method of claim 7, further comprising providing sequential component tiers configured to process/propagate the request through the components without a controller component in a choreography mode.

12. The method of claim 7, wherein the rules archive loads the rules to the component tier before the external request is received.

13. The method of claim 12, further comprising initializing each of the plurality of components with rules from the rules archive at start-up.

14. A computer program product for providing a business application platform, the computer program product comprising a non-transitory computer-readable medium comprising:

a set of codes stored in a plurality of components, each component comprising a processor and a memory, wherein the processor is configured to process a set of business processes and each business process is executed using a set of pre-injected instructions, wherein each component is a self-contained modular logical application node capable of independent deployment and execution, and wherein each of the plurality of components has an equal initial capability of processing power, memory capacity, and ability to implement rules or actions;

a set of codes for providing a plurality of communication conduits linking the plurality of components, the plurality of components and communication conduits defining a component tier;

a set of codes for providing a rules archive comprising responsibility rules and capability rules;

a set of codes for providing a management console, used to configure an injection to the component tier with responsibility rules and the capability rules to perform one or more external requests;

a set of codes to receive an external request;

a set of codes to determine, based on the external request, a need for a specialized component at a location of a first component of the plurality of components in the system, wherein the specialized component includes a specialized capability comprising an adjustment to the initial capability of the first component to meet the need;

a set of codes to determine an additional capability, wherein the additional capability comprises a difference between the required specialized capability and the initial capability of the first component, and wherein the additional capability comprises an addition to the processing power, the memory capacity, or the ability to implement rules or actions for the first component;

a set of codes to receive, from a user device associated with a user, the additional capability; and a set of codes to inject the additional capability dynamically into the first component in the system using the management console, whereby injecting the additional capability dynamically into the first component creates the specialized component without requiring an inclusion of an additional component into the system.

15. The computer program product of claim 14, wherein the pre-injected set of instructions comprise business process rules, operational rules, and communication protocols.

16. The computer program product of claim 14, wherein the communication protocols include every type of communication protocol native to at least one of the plurality of components.

17. The computer program product of claim 14, further comprising a set of codes for a control component configured to receive requests from an external source and process/propagate the request through the plurality of components in an orchestration mode.

18. The computer program product of claim 14, further comprising a set of codes for providing sequential component tiers configured to process/propagate the request through the components without a controller component in a choreography mode.

19. The computer program product of claim 14, wherein the rules archive loads the rules to the component tier before the external request is received.

* * * * *